(12) United States Patent  
Crowell et al.

(10) Patent No.: US 9,384,104 B2  
(45) Date of Patent: Jul. 5, 2016

(54) TESTING A PROCESSOR ASSEMBLY

(71) Applicant: International Business Machines Corporation, Armonk, NY (US)

(72) Inventors: Daniel M Crowell, Rochester, MN (US); James S Fields, Austin, TX (US); Richard B Finch, New Paitz, NY (US); Harald Pross, Wildberg (DE); Gerald G Stanquist, Salt Point, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 283 days.

(21) Appl. No.: 14/092,142

(22) Filed: Nov. 27, 2013

(65) Prior Publication Data

US 2015/0149846 A1    May 28, 2015

(51) Int. Cl.  
*G01R 31/319* (2006.01)  
*G11C 29/56* (2006.01)  
*G06F 11/22* (2006.01)  
*G06F 11/273* (2006.01)

(52) U.S. Cl.  
CPC .......... *G06F 11/2236* (2013.01); *G06F 11/273* (2013.01)

(58) Field of Classification Search  
CPC . H04L 43/50; H04L 12/2697; H04L 41/0672; H04L 43/0811; H04L 2224/92125; H04L 2924/3011; G01R 31/021; G01R 31/045; G01R 31/31905; G06F 11/2236; G06F 15/7867; G06F 1/183; G06F 11/263; G06F 11/273; H01R 24/42; H05K 2201/1053; H05K 3/301; G11C 29/56

USPC .......... 714/E11.166, E11.171, 729, 742, 724, 714/799, E11.17, E11.177, 734, 738; 324/537, 555, 762.01, 750.22, 750.3; 361/803  
See application file for complete search history.

(56) References Cited

U.S. PATENT DOCUMENTS

| | | | |
|---|---|---|---|
| 5,921,812 A | 7/1999 | Choy | |
| 6,067,506 A * | 5/2000 | Goldys | ................. G06F 13/409 |
| | | | 702/117 |
| 6,385,739 B1 * | 5/2002 | Barton | .................. G06F 11/006 |
| | | | 713/189 |

(Continued)

OTHER PUBLICATIONS

Method for a connector housing design compliant to printed circuit board warp, IPCOM000006854D, ip.com, Feb. 6, 2002.

(Continued)

*Primary Examiner* — Phung M Chung  
(74) *Attorney, Agent, or Firm* — Kunzler Law Group; Damion Josephs (57) ABSTRACT

A testing backplane apparatus includes first test ports configured to receive a first processor assembly under test and the plurality of first test ports may be an even number of first test ports or an odd number of first test ports. The testing backplane apparatus includes second test ports, where each first test port corresponds to a second test port and the second test ports connect to a second processor assembly. The testing backplane apparatus includes a signal pathway from each first test port to a second test port. The signal pathway includes a signal path length within a range between a maximum signal path length and a minimum signal path length. Each port on the first processor assembly corresponds to each port on the second processor assembly and the testing backplane apparatus is configured differently from a backplane used as a final destination for operating the first processor assembly.

18 Claims, 5 Drawing Sheets

(56) References Cited

U.S. PATENT DOCUMENTS

| | | | |
|---|---|---|---|
| 6,550,029 B1 * | 4/2003 | Bailey | G01R 31/2801 370/245 |
| 6,891,729 B2 | 5/2005 | Ko et al. | |
| 7,139,949 B1 * | 11/2006 | Jennion | G06F 11/2236 702/118 |
| 7,529,975 B1 | 5/2009 | Davis | |
| 7,602,613 B2 | 10/2009 | Goodwin et al. | |
| 7,646,595 B2 * | 1/2010 | Barsun | H05K 3/301 361/679.31 |
| 8,010,838 B2 | 8/2011 | Bailey et al. | |
| 8,081,474 B1 | 12/2011 | Zohni et al. | |
| 2003/0156400 A1 * | 8/2003 | Dibene, II | G06F 1/18 361/803 |
| 2007/0025261 A1 * | 2/2007 | Ginsberg | H04L 43/50 370/250 |
| 2010/0275065 A1 * | 10/2010 | Cornelius | G06F 11/1645 714/37 |
| 2012/0177035 A1 | 7/2012 | Sharma et al. | |
| 2013/0151898 A1 * | 6/2013 | Hou | G01R 31/045 714/27 |

OTHER PUBLICATIONS

Daniel Dreps—IBM, The 3rd Generation of IBM's Elastic Interface on POWER6, Aug. 19, 2007.

* cited by examiner

TESTING A PROCESSOR ASSEMBLY

FIELD

The subject matter disclosed herein relates to processor assembly testing and more particularly relates to providing a testing backplane for processor assembly testing that may be used for an even number of ports as well as an odd number of ports.

BACKGROUND

Today's computer and server designs are very complex from a hardware architecture perspective. The processor designs utilize both internal and external busses/fabric. This presents a significant challenge and cost to the business when testing each subassembly and achieving 100% functional test coverage. For example, if a backplane that holds several processor assemblies is used for testing, the cost of providing the backplane and the processor assemblies may be high and testing may be very complex due to the large number of processor assemblies that may have problems. If known good processor assemblies are used while a single processor assembly is under test, the cost of testing and providing the known good processor assemblies may be very large. The testing may also be cumbersome and lengthy.

BRIEF SUMMARY

An apparatus for testing of a processor assembly is disclosed. A method and system also perform the functions of the apparatus. A testing backplane apparatus includes a plurality of first test ports where the plurality first test ports are configured to receive a first processor assembly. The first processor assembly is a target processor assembly under test and the plurality of first test ports may be an even number of first test ports or an odd number of first test ports. The testing backplane apparatus includes a plurality of second test ports, where each first test port corresponds to a second test port and the plurality of second test ports connect to a second processor assembly. The testing backplane apparatus includes a signal pathway from each first test port to a second test port. The signal pathway includes a signal path length and the signal path length is within a range between a maximum signal path length and a minimum signal path length. Each port on the first processor assembly corresponds to each port on the second processor assembly and the testing backplane apparatus is configured differently from a backplane used as a final destination for operating the first processor assembly.

In one embodiment, the testing backplane apparatus includes a substrate and each signal pathway is a trace on the substrate, and each trace has a length that matches the signal path length. In another embodiment, each signal pathway has a signal path length that matches a maximum specified length. In another embodiment, one or more signal pathways include one or more additional electrical components facilitating signal communication. In one embodiment, one or more of the signal pathways include a tunable signal pathway. The tunable signal pathway includes one or more variable components to adjust characteristics of the tunable signal pathway. In a further embodiment, the characteristics adjusted by the tunable signal pathway are impedance and/or a signal pathway length.

In one embodiment, the second processor assembly is a second target processor assembly under test. In another embodiment, the second processor assembly is a target processor assembly previously tested and found to be functioning. In another embodiment, the second processor assembly includes processor assembly components built onto the testing backplane apparatus. In another embodiment, the first processor assembly and the second processor assembly include a processor, memory, a printed circuit board ("PCB"), one or more busses, a northbridge, and/or a southbridge.

In one embodiment, the signal pathways are sized so the testing backplane apparatus simulates a backplane designed to receive the first processor assembly and/or the second processor assembly. In another embodiment, each first test port and corresponding signal pathway and second test port include a unidirectional signal pathway or a bidirectional signal pathway. In another embodiment, each signal pathway includes a wire. In another embodiment, the plurality of first test ports and/or the plurality of second test ports include connection points physically arranged to connect to ports on the first processor assembly and the plurality of second test ports include connection points physically arranged to connect to ports on the second processor assembly. In a further embodiment, the plurality of first test ports and/or the plurality of second test ports include a plug-in connection. In one embodiment, each signal pathway connects a port on the first processor assembly to a port on the second processor assembly such that functionality and signal flow of the port on the first processor assembly is compatible with functionality and signal flow of the port on the second processor assembly.

A method for testing a processor assembly includes providing a testing backplane. The testing backplane includes a plurality of first test ports where the plurality first test ports are configured to receive a first processor assembly. The first processor assembly is a target processor assembly under test. The plurality of first test ports may include an even number of first test ports or an odd number of first test ports. The testing backplane includes a plurality of second test ports, where each first test port corresponds to a second test port. The plurality of second test ports connects to a second processor assembly. The testing backplane includes a signal pathway from each first test port to a second test port. The signal pathway includes a signal path length where the signal path length is within a range between a maximum signal path length and a minimum signal path length. Each port on the first processor assembly corresponds to each port on the second processor assembly, and the testing backplane is configured differently from a backplane used as a final destination for operating the first processor assembly.

The method includes connecting a first processor assembly to the plurality of first test ports, and testing the first processor assembly by communicating over the signal pathways between the plurality of first test ports and the plurality of second test ports. In one embodiment, the method includes connecting a second processor assembly to plurality of second test ports prior to testing the first processor assembly, and simultaneously testing the first processor assembly and the second processor assembly by communicating over the signal pathways between the plurality of first test ports and the plurality of second test ports.

In one embodiment, a testing backplane apparatus includes a substrate and a plurality of first test ports on the substrate. The plurality first test ports are configured to receive a first processor assembly. The first processor assembly is a target processor assembly under test. The plurality of first test ports may include an even number of first test ports or an odd number of first test ports. The testing backplane includes a plurality of second test ports on the substrate, where each first test port corresponds to a second test port. The plurality of second test ports connects to a second processor assembly. The testing backplane includes a signal pathway from each first test port to a second test port, where each signal pathway includes a trace on the substrate with a signal path length. The signal path length is within a range between a maximum signal path length and a minimum signal path length. The second processor assembly is a second target processor assembly under test, a target processor assembly previously tested and found to be functioning, or processor assembly components built onto the substrate. Each port on the first processor assembly corresponds to each port on the second processor assembly and the testing backplane apparatus is configured differently from a backplane used as a final destination for operating the first processor assembly. In one embodiment, each signal pathway has a signal path length that matches a maximum specified length.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

Figure 1:
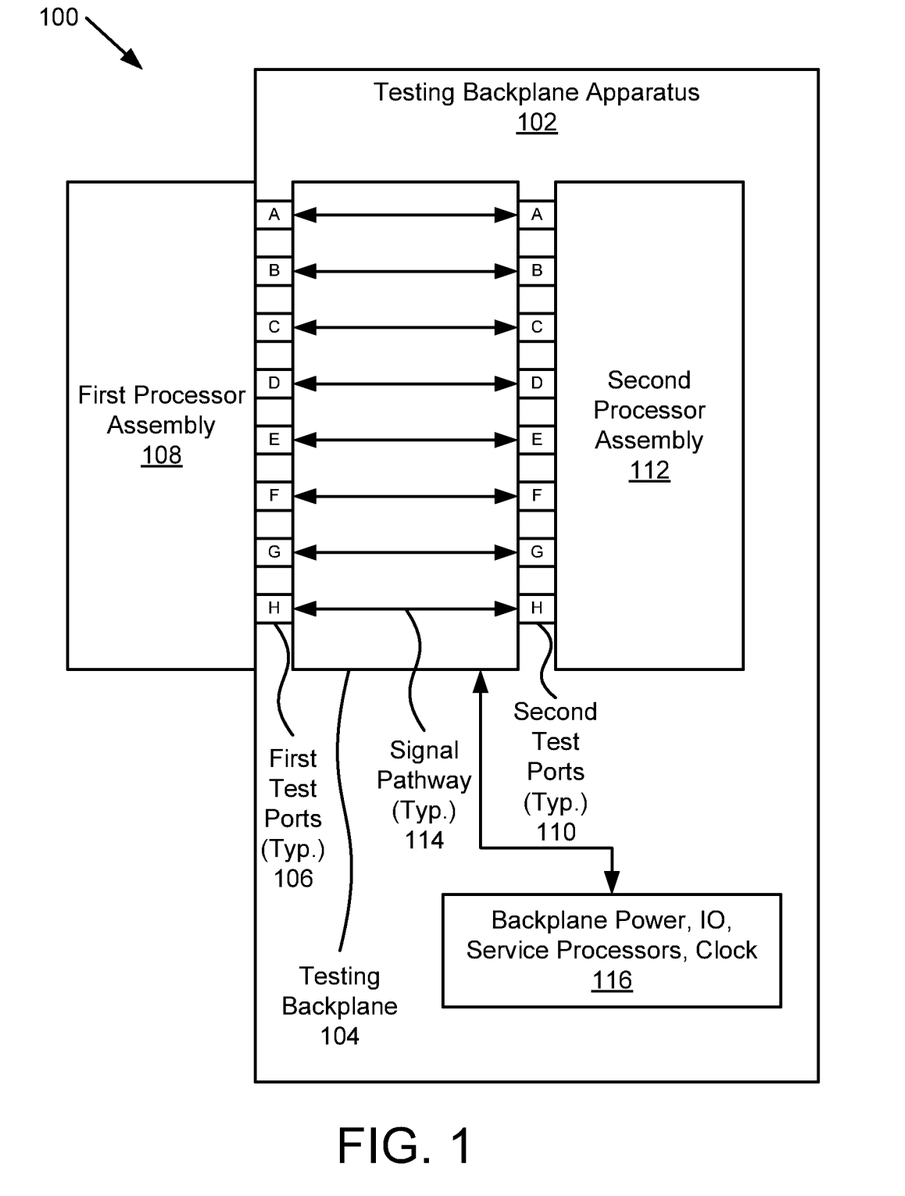
FIG. 1 is a schematic block diagram illustrating one embodiment of a testing backplane apparatus in accordance with one embodiment of the present invention.

FIG. 1 is a schematic block diagram illustrating one embodiment 100 of a testing backplane apparatus 102 in accordance with one embodiment of the present invention. In the embodiment 100, the testing backplane apparatus 102 includes a testing backplane 104, with a plurality of first test ports 106 connected to a first processor assembly 108, a plurality of second test ports 110 connected to a second processor assembly 112, a signal pathway 114 between each first test port 106 and a corresponding second test port 110, and connections 116 and other hardware for backplane power, input/output ports, one or more service processors, a clock, etc.

The testing backplane apparatus 102 is configured to receive a first processor assembly 108 for testing the first processor assembly 108 under conditions that are similar to when the first processor assembly 108 is operational at a final destination. In some embodiments, the testing backplane apparatus 102 also tests a second processor assembly 112 simultaneously with the first processor assembly 108. The first processor assembly 108 and the second processor assembly 112 have a same number of signal ports to be tested so the first processor assembly 108 may have an even or an odd number of ports. Likewise, the second processor assembly 112 may have an even or an odd number of ports.

In one embodiment, the first processor assembly 108 includes a processor along with a printed circuit board ("PCB"), which may be a motherboard, and other components typically found on a PCB. For example, the first processor assembly 108 may include memory chips, busses, a northbridge, a southbridge, peripheral connections, and the like. In one embodiment, the first processor assembly 108 is a fully functional computer system that may be plugged into a case as a standalone computer or may be plugged into a backplane as part of a multiprocessor device, such as a partitionable mainframe computer. For example, the first processor assembly 108 may be a Blade™ in a BladeCenter® made by International Business Machines®. In another embodiment, the first processor assembly 108 includes a processor and components but may be less functional than a full computer and may be intended for a specific, limited function.

The first processor assembly 108 includes ports for communication external to the first processor assembly 108. The ports may include serial bus ports, parallel bus ports, Ethernet ports, universal serial bus ("USB") ports, audio ports, video ports such as digital visual interface ("DVI") ports, peripheral serial interface ("PCI") ports, PCI Express ports, and the like. To properly test the first processor assembly 108, connection of the first processor assembly 108 ports and then running tests where signals are input and output through the ports helps to verify that the first processor assembly 108 is functioning properly.

Testing where communication with the ports of the first processor assembly 108 is merely simulated or where signals sent out through a port are returned to the same port are not as effective as testing of the first processor assembly 108 where the ports may be exercised under load. The testing backplane apparatus 102 is configured to allow signals to be passed in and out of the ports of the first processor assembly 108 under conditions simulating actual conditions as well as worst case conditions. Where a second processor assembly 112 is also a processor assembly under test, the description above regarding the first processor assembly 108 is also applicable.

The testing backplane apparatus 102 includes a plurality of first test ports 106. Typically there is at least a first test port 106 for each port on the first processor assembly 108. While the first test ports 106 are shown on one side of the first processor assembly 108, other configurations of a testing backplane apparatus 102 may include first test ports 106 along other sides of the first processor assembly 108. In one embodiment, the first test ports 106 are spaced to match with the ports of the first processor assembly 108 to facilitate connection of the first processor assembly 108 to the testing backplane apparatus 102. In another embodiment, the first test ports 106 include connectors, such as slot connectors to allow the first processor assembly 108 to be plugged into the first test ports 106. In another embodiment, the first test ports 106 are connectors that attach individually to the ports of the first processor assembly 108. In another embodiment, the first test ports 106 are connectors that attach by placing the first processor assembly 108 adjacent to the first test ports 106 and then the first test ports 106 clamp to the ports of the first processor assembly 108. Other connectors may also be used for the first test ports 106 and one of skill in the art will recognize other connection methods and types.

The testing backplane apparatus 102 includes a plurality of second test ports 110 that connect to a second processor assembly 112. The second test ports 110, in one embodiment, are identical to the first test ports 110. For example, the second processor assembly 112 may be identical to the first processor assembly 108 and may connect to the second test ports 110 the same way that the first test ports 106 connect to the first processor assembly 108. In another embodiment, the second test ports 110 differ from the first test ports 106. The second processor assembly 112 may also differ from the first processor assembly 108. For example, functions of the ports of the first processor assembly 108 may be matched with functions of ports of the second processor assembly 112 even though the two processor assemblies 108, 110 are different and a port on the first processor assembly 108 with a particular function may be routed to a compatible port on the second processor assembly 112.

In the depicted embodiment, the second processor assembly 112 is part of the testing backplane apparatus 102. In this embodiment 100, the second backplane apparatus 102 may not be under test. For example, the second processor assembly 112 may be a known good processor assembly. For instance, the second processor assembly 112 may have been previously tested and found to be functioning properly. The testing backplane apparatus 102, in this embodiment 100, may then include the testing backplane 104, with first and second test ports 106, 110, signal pathways 114, etc. along with the second processor assembly 112. Other embodiments 200, 300 are described in relation to FIGS. 2 and 3.

The testing backplane 104 includes a signal pathway 114 from each first test port 106 to a corresponding second test port 110. For example, there may be a one-to-one correlation between first and second test ports 106, 110. In one embodiment, a first test port 106 may connect to a port of the first processor assembly 108 that has a particular function and the signal pathway 114 connected to the first test port 106 may route the signal from the port on the first processor assembly 108 to a compatible port on the second processor assembly 112 connected to a second test port 110. For example, a port on the first processor assembly 108 may be a send port and is routed by a signal pathway to a receive port on the second processor assembly 112. In another example, a port on the first processor assembly 108 may be a bidirectional port and is routed by a signal pathway to a bidirectional port on the second processor assembly 112. In another embodiment, the first and second test ports 106, 110 and corresponding signal pathways 114 connect ports that are not fully compatible but may still be connected. For example, a send port may be connected to a bidirectional port and during testing signals may flow from the send port to the bi-directional port while signals are not sent from the bi-directional port. One of skill in the art will recognize other forms of compatibility and incompatibility and where ports may be connected and tested for fully or partially compatible ports.

The testing backplane 104 includes a signal pathway 114 between each first test port 106 and a corresponding second test port 110. Each signal pathway 114 has a signal path length and the signal path length is within a range between a maximum signal path length and a minimum signal path length. For example, a particular port of the first processor assembly 108 may include specified parameters for connection for proper operation of the port. The specified parameters may include a maximum signal path length between the first processor assembly 108 and a device connected to the first processor assembly 108. In some instances, the specifications for a port may include a minimum path length. In another instance, the specifications may not include minimum path length and the minimum path length may be considered to be zero.

In one embodiment, each signal pathway 114 from a first test port 106 to a corresponding second test port 110 has a physical length that is between a maximum specified path length and a minimum specified path length. For example, each signal pathway 114 may have a length that is the maximum specified signal path length for the particular ports that the signal pathway 114 connects. Having the signal pathways 114 set to a maximum path length, in some instances represents a worst case and testing with the signal pathways 114 set to the maximum path length may exercise the first processor assembly 108 and second processor assembly 112 under what may be considered worst case conditions. In other embodiments, the lengths of the signal pathways 114 may not all be set at a maximum signal path length. For example, some testing may be beneficial when, for example, a signal pathway 114 is set at a maximum path length while another signal pathway 114 is set at a shorter path length, such as at a minimum path length. In another example, the signal pathways 114 may be set at minimum path lengths or are made as short as practical to test conditions when the first and second processor assemblies 108, 112 are close.

In one embodiment, the testing backplane 104 includes a substrate, or PCB, and a length of a signal pathway 114 is set by routing a trace on the PCB. The trace may be routed in various directions and patterns so that the trace length will be at a specified path length. In another embodiment, one or more signal pathways 114 are wires that are a specified length. The signal pathways 114 may also be configured to match certain parameters, such as impedance. The signal pathways 114 may be of a certain width, height, etc. and may be routed in a way to match certain design constraints so that the signal pathways 114 meet specified signal transmission characteristics. For example, the signal pathways 114 may be routed with a certain spacing from each other, from components, from the same signal pathway 114, etc. to avoid negative effects of spacing that is too close. In other embodiments, the signal pathways 114 include other components, such as surge suppression, buffers, etc. The other components may be active or passive and may mimic components found on backplanes and other devices connected to the ports of the first and second processor assemblies 108, 112 or may be included so that the signal pathways 114 meet specified parameters for signal transmission.

The testing backplane 104 may also include connections 116 and other hardware for backplane power, input/output ports, one or more service processors, a clock, etc. For example, the testing backplane 104 may include a connection for a power supply or may include a power supply. The testing backplane 104 may include input/output ports to allow monitoring of signals, controlling of the first and second processor assemblies 108, 112, controlling testing, etc. by an external computer. The testing backplane 104 may also include connections 116 to a service processor, baseboard management controller ("BMC"), hypervisor, etc. that controls some functions on the testing backplane 104. The testing backplane 104 may include some type of controller/processor to manage functions like temperature control, sensors, alerts, rebooting a processor, etc.

Figure 2:
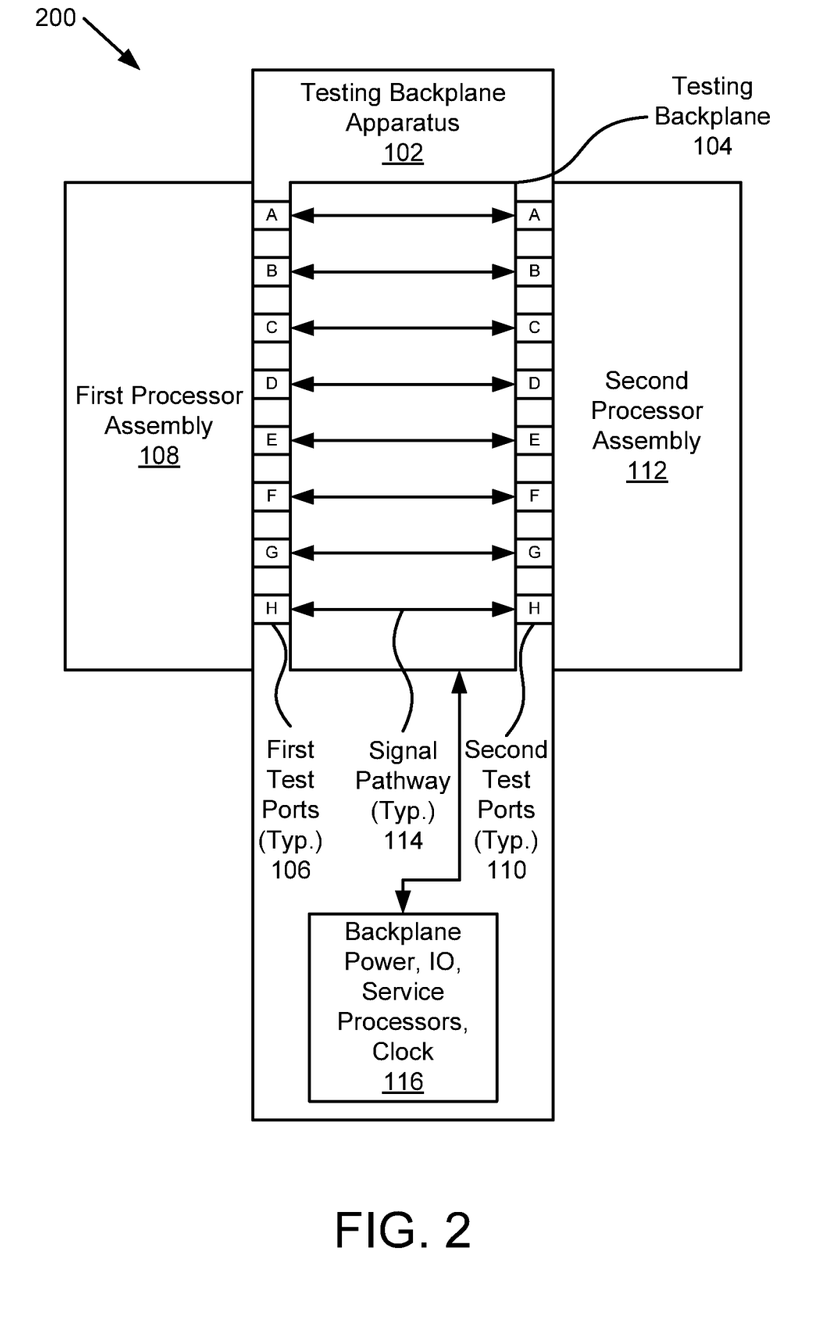
FIG. 2 is a schematic block diagram illustrating a second embodiment of a testing backplane apparatus in accordance with one embodiment of the present invention.

FIG. 2 is a schematic block diagram illustrating a second embodiment 200 of a testing backplane apparatus 102 in accordance with one embodiment of the present invention. In the embodiment 200, the second processor assembly 112 is separate from the testing backplane apparatus 102. In this embodiment 200, the second processor assembly 112 may be under test as well as the first processor assembly 108. Testing the first and second processor assemblies 108, 112 simultaneously may be advantageous to increase testing throughput, but may also offer unique challenges, such as determining which processor assembly is not functioning where testing shows a problem. In one example, the second processor assembly 112 is identical or nearly identical to the first processor assembly 108. For instance, the second processor assembly 112 may have similar or identical port functions but may be of a different production run, different model number, etc.

Figure 3:
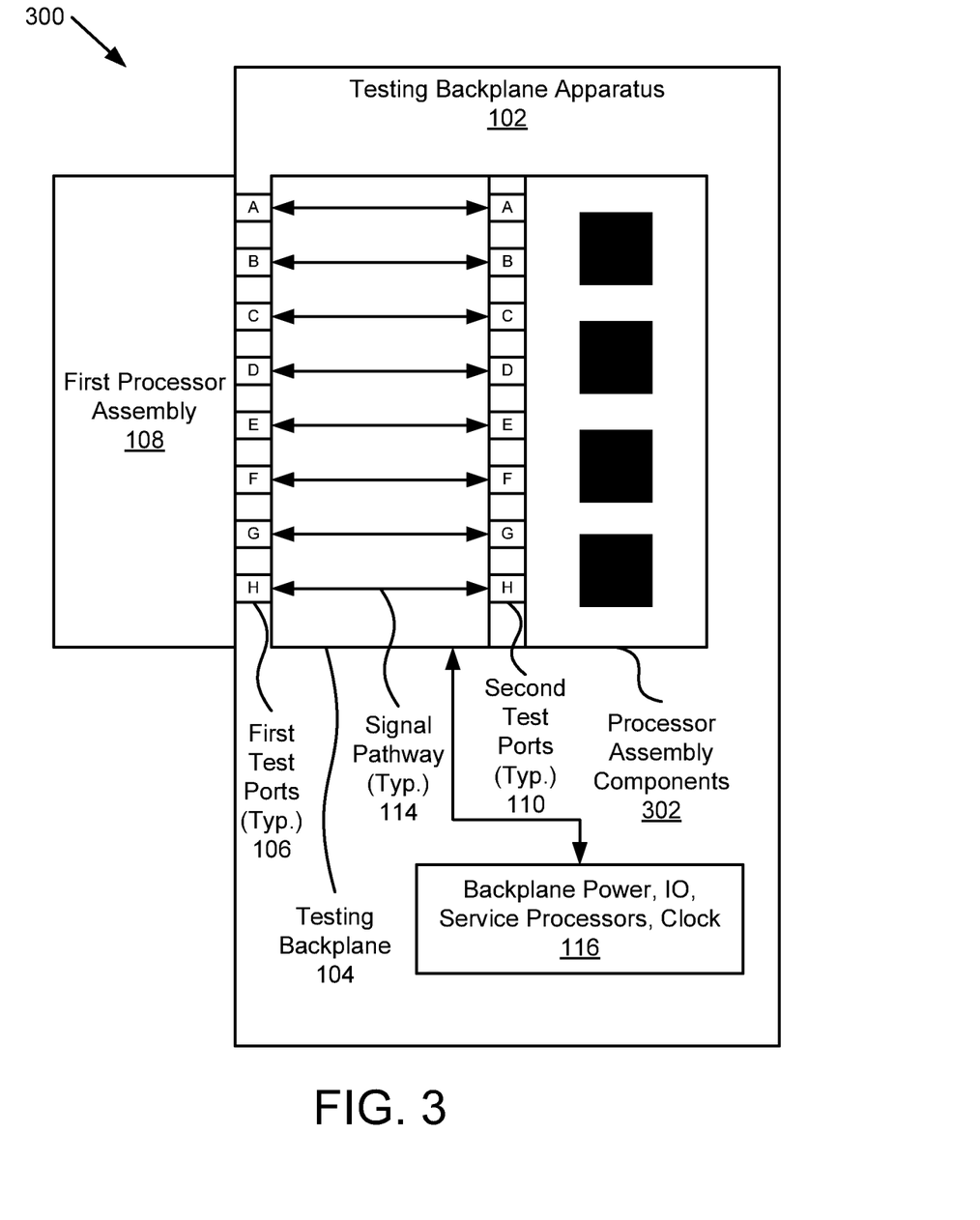
FIG. 3 is a schematic block diagram illustrating a third embodiment of a testing backplane apparatus in accordance with one embodiment of the present invention.

FIG. 3 is a schematic block diagram illustrating a third embodiment 300 of a testing backplane apparatus 102 in accordance with one embodiment of the present invention. In the embodiment 300, the testing backplane apparatus 102 is connected to a first processor assembly 108 through first test ports 106, has second test ports 110, signal pathways 114 between the first test ports 106 and second test ports 110, on a testing backplane 104, and includes connections 116 and other hardware for backplane power, input/output ports, one or more service processors, a clock, etc., which are similar to the embodiments 100, 200 of FIGS. 1 and 2. However, in the embodiment 300 the second processor assembly 112 is replaced by processor assembly components 302. The processor assembly components 302, in one example, are components that may be found on a first processor assembly 108, but are instead located on the testing backplane 104. In another embodiment, the processor assembly components 302 are different than components on the first processor assembly 108 but have ports that are compatible for testing with ports of the first processor assembly 108. Putting the processor assembly components 302 on the testing backplane 104 may have certain advantage, such as cost savings, controllability, elimination of connections that may fail, etc.

Figure 4:
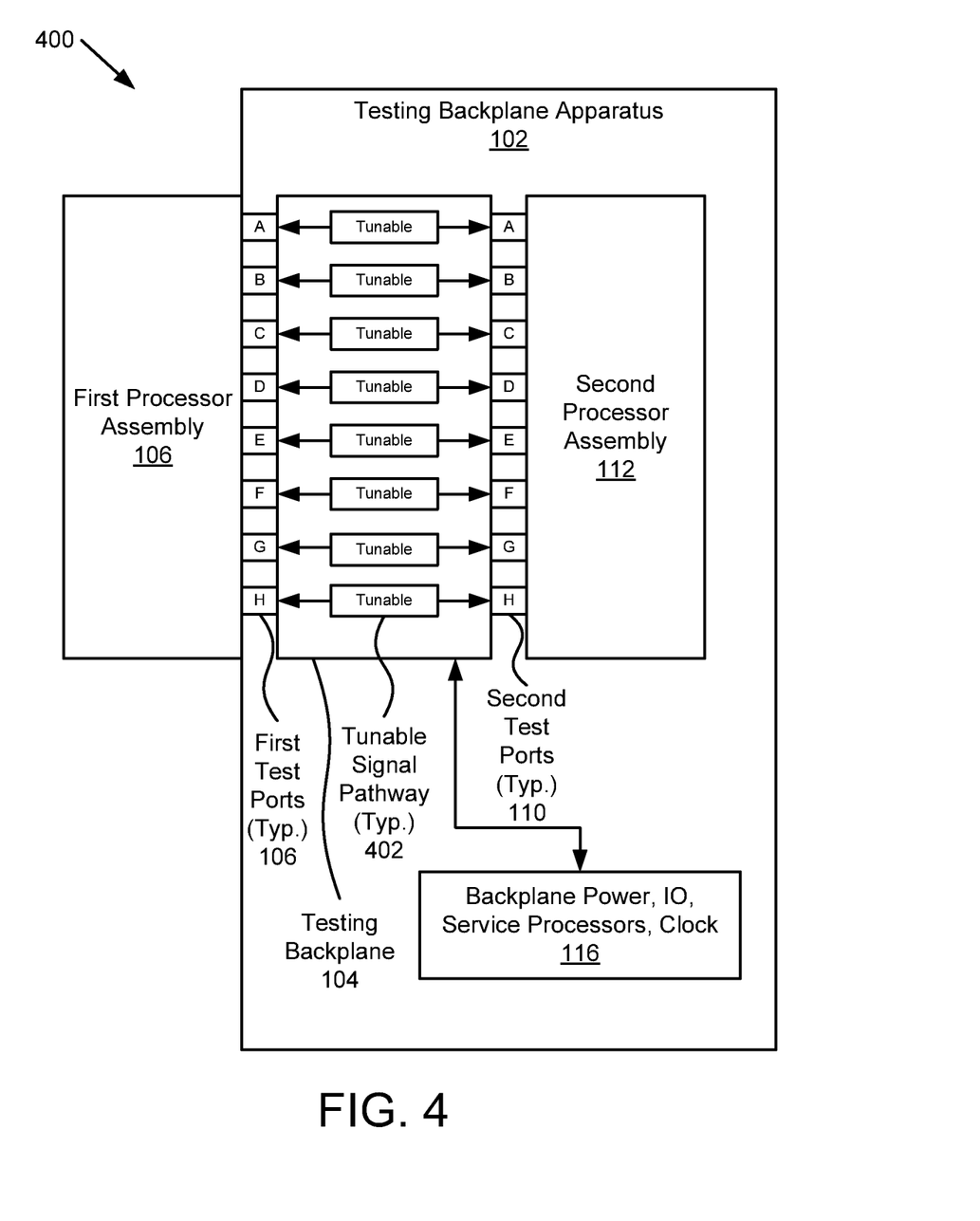
FIG. 4 is a schematic block diagram illustrating a fourth embodiment of a testing backplane apparatus with tunable signal pathways in accordance with one embodiment of the present invention.

FIG. 4 is a schematic block diagram illustrating a fourth embodiment 400 of a testing backplane apparatus 102 with tunable signal pathways 402 in accordance with one embodiment of the present invention. In the embodiment 400, the testing backplane apparatus 102 includes a testing backplane 104 that connects to a first processor assembly 108 through first test ports 106, has a second processor assembly 112 connected to second test ports 110, and includes connections 116 and other hardware for backplane power, input/output ports, one or more service processors, a clock, etc., which are similar to the embodiments 100, 200, 300 of FIGS. 1, 2 and 3. The embodiment 400 differs from the embodiments 100, 200, 300 of FIGS. 1, 2 and 3 in that the signal pathways are tunable signal pathways 402 between the first test ports 106 and second test ports 110.

The tunable signal pathways 402 may include components, switches, etc. to be able to change one or more parameters of the signal pathways. For example, the tunable signal pathways 402 may be able to be adjusted to simulate changes in length of the signal pathways. In another embodiment, the tunable signal pathways 402 may include an ability to change parameters such as impedance, buffering, etc. In one example, the tunable signal pathways 402 include variable components, such as variable resistors, inductors, capacitors, etc. to change parameters of the signal pathways. In another embodiment, the tunable signal pathways 402 include active components such as semiconductor switches operating in an active region to vary parameters of the signal pathways. The tunable signal pathways 402 may be manually tunable or changeable using control signals. The tunable signal pathways 402 are advantageous because the testing backplane apparatus 102 of the depicted embodiment 400 may be useful for testing of a wide variety of conditions, parameters, processor assemblies, etc. One of skill in the art will recognize other ways that the tunable signal pathways 402 may be constructed and used.

Figure 5:
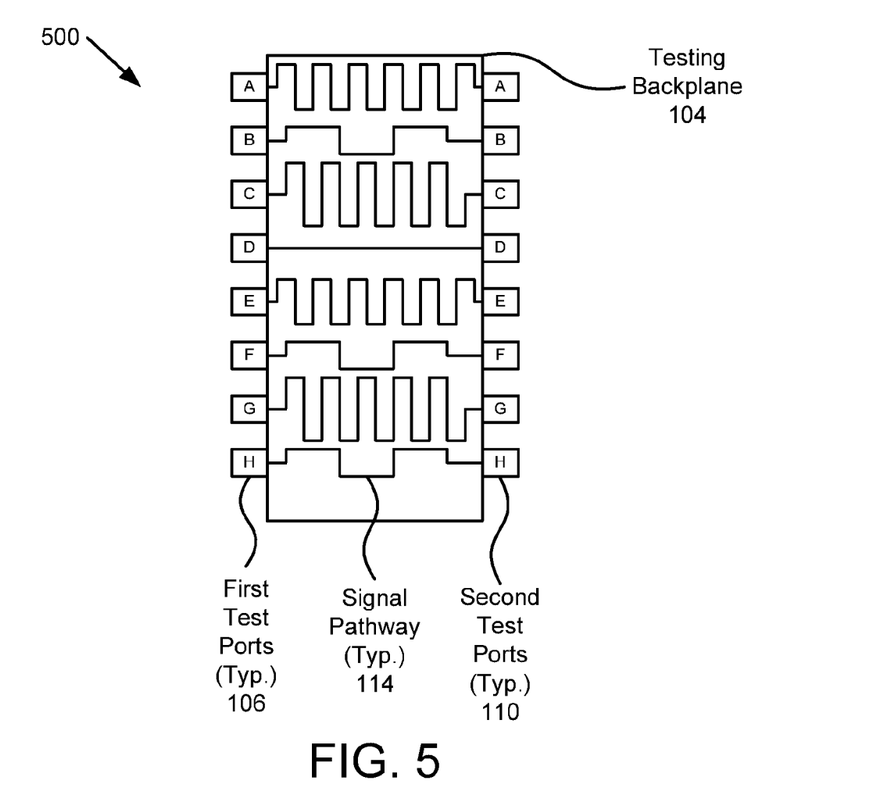
FIG. 5 is a schematic block diagram illustrating one embodiment of trace layout on a testing backplane apparatus in accordance with one embodiment of the present invention.

FIG. 5 is a schematic block diagram illustrating one embodiment of trace layout 500 on a testing backplane apparatus 102 in accordance with one embodiment of the present invention. For the trace layout 500, other components, such as the first processor assembly 108, second processor assembly 112, and connections 116 and other hardware for backplane power, input/output ports, one or more service processors, a clock, etc. are omitted for clarity. The trace layout 500 depicts signal pathways 114 of various lengths. As mentioned previously, the signal pathways 114 may be routed in various patterns to increase length for a desired condition, such as maximum pathway length. While the traces are shown on top of the testing backplane 104, it is understood that the traces may be routed on various layers of a multilayer PCB. One of skill in the art will recognize ways to route traces to achieve a desired length while using typical good practice for trace layout.

Figure 6:
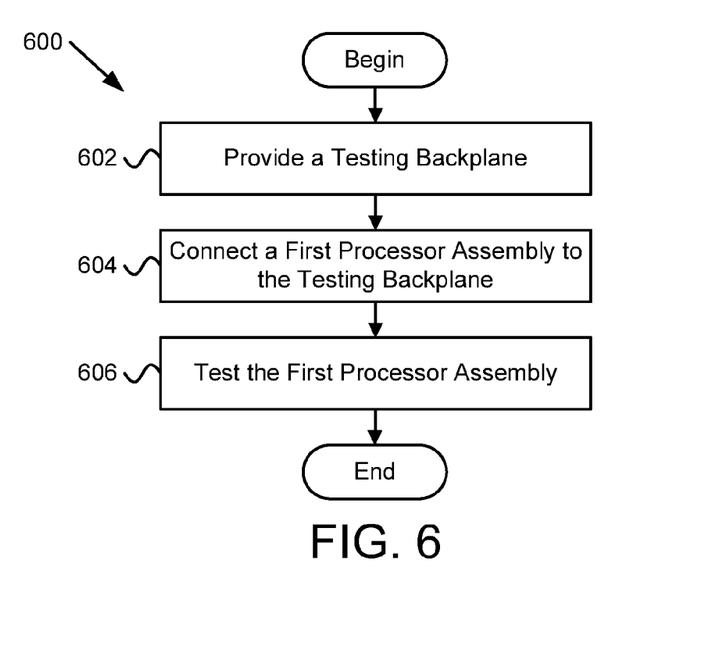
FIG. 6 is a schematic flow chart diagram illustrating one embodiment of a method for testing a processor assembly in accordance with the present invention.

FIG. 6 is a schematic flow chart diagram illustrating one embodiment of a method for testing a processor assembly in accordance with the present invention. The method 600 begins and provides 602 a testing backplane 104. The testing backplane 104 includes a plurality of first test ports 106 configured to receive a first processor assembly 108. The first processor assembly 108 includes a target processor assembly under test. The plurality of first test ports 106 may include an even number of first test ports 106 or an odd number of first test ports 106. The testing backplane 104 includes a plurality of second test ports 110 where each first test port 106 corresponds to a second test port 110.

The second test ports 110 connect to a second processor assembly 112. The testing backplane 104 includes a signal pathway 114 from each first test port 106 to a second test port 110. Each signal pathway 114 includes a signal path length where the signal path length is within a range between a maximum signal path length and a minimum signal path length. Each port on the first processor assembly 108 corresponds to each port on the second processor assembly 112 and the testing backplane 104 is configured differently from a backplane used as a final destination for operating the first processor assembly 108.

The method 600 includes connecting 604 a first processor assembly 108 to the first test ports 106 and testing 606 the first processor assembly by communicating over the signal pathways 114 between the first test ports 106 and the second test ports 110, and the method 600 ends. In one embodiment, the method 600 includes connecting a second processor assembly to plurality of second test ports prior to testing the first processor assembly (not shown) and simultaneously testing the first processor assembly 108 and the second processor assembly 112 by communicating over the signal pathways 114 between the first test ports 106 and the second test ports 110.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A testing backplane apparatus comprising:
    a plurality of first test ports, the plurality first test ports configured to receive a first processor assembly, the first processor assembly comprising a target processor assembly under test, the plurality of first test ports comprising one of an even number of first test ports and an odd number of first test ports;
    a plurality of second test ports, wherein each first test port corresponds to a second test port, the plurality of second test ports connecting to a second processor assembly; and
    a signal pathway from each first test port to a second test port, the signal pathway comprising a signal path length, the signal path length within a range between a maximum signal path length and a minimum signal path length, wherein one or more of the signal pathways comprise a tunable signal pathway, the tunable signal pathway comprising one or more variable components to adjust characteristics of the tunable signal pathway in order to test the first processor assembly under various conditions, the characteristics comprising one or more of impedance and a signal pathway length,
    wherein each port on the first processor assembly corresponds to each port on the second processor assembly such that signals are transmitted between corresponding ports of the first processor assembly and the second processor assembly during the testing of at least one of the first processor assembly and the second processor assembly.

2. The apparatus of claim 1, further comprising a substrate, wherein each signal pathway comprises a trace on the substrate and each trace has a length that matches the signal path length.

3. The apparatus of claim 2, wherein each signal pathway has a signal path length that matches a maximum specified length.

4. The apparatus of claim 2, wherein one or more signal pathways comprise one or more additional electrical components facilitating signal communication.

5. The apparatus of claim 1, wherein the second processor assembly comprises a second target processor assembly under test.

6. The apparatus of claim 1, wherein the second processor assembly comprises a target processor assembly previously tested and found to be functioning.

7. The apparatus of claim 1, wherein the second processor assembly comprises processor assembly components built onto the testing backplane apparatus.

8. The apparatus of claim 1, wherein the first processor assembly and the second processor assembly comprises one or more of a processor, memory, a printed circuit board ("PCB"), one or more busses, a northbridge, and a southbridge.

9. The apparatus of claim 1, wherein the signal pathways are sized so the testing backplane assembly simulates a backplane designed to receive one or more of the first processor assembly and the second processor assembly.

10. The apparatus of claim 1, wherein each first test port and corresponding signal pathway and second test port comprises one of a unidirectional signal pathway and a bidirectional signal pathway.

11. The apparatus of claim 1, wherein each signal pathway comprises a wire.

12. The apparatus of claim 1, wherein one or more of the plurality of first test ports and the plurality of second test ports comprise connection points physically arranged to connect to ports on the first processor assembly and the plurality of second test ports comprise connection points physically arranged to connect to ports on the second processor assembly.

13. The apparatus of claim 12, wherein one or more of the plurality of first test ports and the plurality of second test ports comprise a plug-in connection.

14. The apparatus of claim 1, wherein each signal pathway connects a port on the first processor assembly to a port on the second processor assembly such that functionality and signal flow of the port on the first processor assembly is compatible with functionality and signal flow of the port on the second processor assembly.

15. A method for testing comprising:
    providing a testing backplane comprising
        a plurality of first test ports, the plurality first test ports configured to receive a first processor assembly, the first processor assembly comprising a target processor assembly under test, the plurality of first test ports comprising one of an even number of first test ports and an odd number of first test ports;
        a plurality of second test ports, wherein each first test port corresponds to a second test port, the plurality of second test ports connecting to a second processor assembly; and
        a signal pathway from each first test port to a second test port, the signal pathway comprising a signal path length, the signal path length within a range between a maximum signal path length and a minimum signal path length, wherein one or more of the signal pathways comprise a tunable signal pathway, the tunable signal pathway comprising one or more variable components to adjust characteristics of the tunable signal pathway in order to test the first processor assembly under various conditions, the characteristics comprising one or more of impedance and a signal pathway length, wherein each port on the first processor assembly corresponds to each port on the second processor assembly such that signals are transmitted between corresponding ports of the first processor assembly and the second processor assembly during the testing of at least one of the first processor assembly and the second processor assembly, connecting a first processor assembly to the plurality of first test ports; and testing the first processor assembly by communicating over the signal pathways between the plurality of first test ports and the plurality of second test ports.

16. The method of claim 15, further comprising connecting a second processor assembly to plurality of second test ports prior to testing the first processor assembly; and simultaneously testing the first processor assembly and the second processor assembly by communicating over the signal pathways between the plurality of first test ports and the plurality of second test ports.

17. A testing backplane apparatus comprising:

a substrate;

a plurality of first test ports on the substrate, the plurality first test ports configured to receive a first processor assembly, the first processor assembly comprising a target processor assembly under test, the plurality of first test ports comprising one of an even number of first test ports and an odd number of first test ports;

a plurality of second test ports on the substrate, wherein each first test port corresponds to a second test port, the plurality of second test ports connecting to a second processor assembly; and a signal pathway from each first test port to a second test port, wherein each signal pathway comprises a trace on the substrate comprising a signal path length, the signal path length within a range between a maximum signal path length and a minimum signal path length, wherein one or more of the signal pathways comprise a tunable signal pathway, the tunable signal pathway comprising one or more variable components to adjust characteristics of the tunable signal pathway in order to test the first processor assembly under various conditions, the characteristics comprising one or more of impedance and a signal pathway length, wherein the second processor assembly comprises one of a second target processor assembly under test;

a target processor assembly previously tested and found to be functioning; and processor assembly components built onto the substrate, wherein each port on the first processor assembly corresponds to each port on the second processor assembly such that signals are transmitted between corresponding ports of the first processor assembly and the second processor assembly during the testing of at least one of the first processor assembly and the second processor assembly.

18. The testing backplane apparatus of claim 17, wherein each signal pathway has a signal path length that matches a maximum specified length.

* * * * *